(12) United States Patent
Arsov

(10) Patent No.: US 12,076,713 B2
(45) Date of Patent: Sep. 3, 2024

(54) POLYMERIZATION INSTALLATION WITH INTEGRATED COMBINED ABSORPTION-DIFFUSION AND ABSORPTION-CONDENSATION UNIT AND ITS APPLICATION FOR POLYMER AND COPOLYMER PREPARATION

(71) Applicant: CHEMICAL INNOVATION LTD., Sofia (BG)

(72) Inventor: Kamen Yordanov Arsov, Batanovtsi (BG)

(73) Assignee: CHEMICAL INNOVATION LTD., Sofia (BG)

( * ) Notice: Subject to any disclaimer, the term of this patent is extended or adjusted under 35 U.S.C. 154(b) by 0 days.

(21) Appl. No.: 17/774,240

(22) PCT Filed: Nov. 2, 2020

(86) PCT No.: PCT/BG2020/000037
§ 371 (c)(1),
(2) Date: May 4, 2022

(87) PCT Pub. No.: WO2021/087581
PCT Pub. Date: May 14, 2021

(65) Prior Publication Data
US 2022/0401902 A1  Dec. 22, 2022

(30) Foreign Application Priority Data
Nov. 5, 2019 (BG) ........................................ 113020

(51) Int. Cl.
*B01J 3/04* (2006.01)
*B01D 53/18* (2006.01)
(Continued)

(52) U.S. Cl.
CPC ................ *B01J 3/04* (2013.01); *B01D 53/18* (2013.01); *B01J 19/18* (2013.01); *C08F 2/01* (2013.01);
(Continued)

(58) Field of Classification Search
None
See application file for complete search history.

(56) References Cited

U.S. PATENT DOCUMENTS

| | | |
|---|---|---|
| 4,035,329 A | 7/1977 | Wiest et al. |
| 4,282,339 A | 8/1981 | Donaldson et al. |

(Continued)

FOREIGN PATENT DOCUMENTS

| | | |
|---|---|---|
| CN | 1127554 C | 11/2003 |
| CN | 111957272 A * | 11/2020 |

(Continued)

OTHER PUBLICATIONS

International Search Report and Written Opinion issued on Jan. 22, 2021 in corresponding International Patent Application No. PCT/BG2020/000037; 11 pages.

*Primary Examiner* — Jennifer A Leung
(74) *Attorney, Agent, or Firm* — Maier & Maier, PLLC

(57) ABSTRACT

A polymerization installation with integrated combined absorption-diffusion and absorption-condensation unit, as well as to its use for the preparation of various polymers and copolymers by addition, emulsion, suspension or radical polymerization, which will find application in chemical industry. There are four structural units in the installation, as follows: supply unit (A), reaction unit (B), combined absorption-diffusion and absorption-condensation unit (C) and finished product discharge unit (D).

6 Claims, 2 Drawing Sheets

(51) Int. Cl.
*B01J 19/18* (2006.01)
*C08F 2/01* (2006.01)

(52) U.S. Cl.
CPC .............. *B01J 2219/00108* (2013.01); *B01J 2219/0013* (2013.01)

(56) References Cited

U.S. PATENT DOCUMENTS

| | | | |
|---|---|---|---|
| 4,657,994 | A | 4/1987 | Tanaka et al. |
| 6,831,139 | B2 | 12/2004 | Kawahara et al. |
| 2009/0321317 | A1 | 12/2009 | Widmer et al. |
| 2013/0296524 | A1* | 11/2013 | Matsumoto .......... B01J 19/0053 422/138 |
| 2017/0204219 | A1* | 7/2017 | Alidedeoglu ........ B01J 19/1862 |

FOREIGN PATENT DOCUMENTS

| | | |
|---|---|---|
| DE | 102007041796 A1 | 3/2009 |
| RU | 2626614 C2 | 6/2017 |
| WO | 2010006941 A1 | 1/2010 |
| WO | 2010092040 A1 | 8/2010 |

\* cited by examiner

POLYMERIZATION INSTALLATION WITH INTEGRATED COMBINED ABSORPTION-DIFFUSION AND ABSORPTION-CONDENSATION UNIT AND ITS APPLICATION FOR POLYMER AND COPOLYMER PREPARATION

FIELD

The invention refers to a polymerization installation with an integrated combined absorption-diffusion and absorption-condensation unit, as well as to the possibility of its use for the preparation of various polymers and copolymers by different types of processes—addition, emulsion, suspension or radical polymerization.

The installation of this invention will find application in the chemical industry.

BACKGROUND

The various structural systems and apparatuses for polymer and copolymer production known from the literature and practice are distinguished mainly according to the polymerization method applied, as well as the method of providing continuous or periodic introduction and interaction maintenance between the basic and auxiliary reagents involved in the processes. A large number of installations with different purposes are also known, in which Venturi type structural elements are installed to intensify the impact on pressure and temperature. Patent RU2626614 presents a heating system ensuring steam consumption savings, which is implemented in an installation comprising a heat exchanger, a supply device for feeding steam to the heat exchanger with a control valve and a point for measuring the steam flow to a Venturi pipe, a condensate trap and a secondary steam generator, from which the steam flow is taken to a low pressure zone into the Venturi pip and its connection to the main steam flow that passes there.

U.S. Pat. No. 4,657,994 reveals a method for continuous EVA production by emulsion polymerization using an aliphatic alcohol solvent, claiming improved removal of reaction heat, consisting of multi-tube heat exchanger and a polymerization vessel with a mixer, in which, during the heat exchange, and in order to raise the temperature of the inflowing reagents fed into the upper part of the heat exchanger to a higher melting point, heat is drawn from another recirculating reagent with a lower boiling point and the vapors released from the reactor are introduced into the bottom of the heat exchanger, with simultaneous solubilization of the reagents in the heat exchanger.

U.S. Pat. No. 4,282,339 describes an ethylene polymerization process carried out in a reaction system consisting of two reactors with series connection (tubular or autoclave type) with an intermediate heat exchanger with a cooler installed therebetween, where the reaction flow from the first reactor passes through the heat exchanger at elevated pressure and temperature, and from there, the cooled reaction flow, which pressure has been reduced by a pressure relief valve, is introduced into the second reactor for further polymerization.

U.S. Pat. No. 4,035,329 reveals a method for styrene and butadiene emulsion polymerization carried out in a system consisting of reactor and tubular heat exchanger above it, in the upper part of which the butadiene vapor from the reactor is introduced and the cooled condensate is returned to the reactor to lower the reaction mixture temperature.

U.S. Pat. No. 6,831,139 describes a method for poly production (ethylene vinyl acetate) (EVA) in a polymerization solution, in the presence of an initiator, carried out in an installation consisting of a polymerization reactor and a reflux condenser in which the vapors of at least one of the components of the polymerization solution are received and the cooled condensate is returned to the reactor on a recirculation basis.

Most known design solutions, however, provide hardware methods for the production of copolymers in which, in addition to the main components (primary polymers), a number of other reagents accompanying the polymerization are used.

SUMMARY

A problem of the present invention is the creation of an installation for polymers and copolymers production, ensuring the running of different types of polymerization and copolymerization processes, i.e. addition, emulsion, suspension or radical polymerization, using primary and secondary polymers as basic starting components, and with the maximum limited participation of additional reagents in relation to the polymerization process.

The problem of the invention is solved by a polymerization installation with an integrated combined absorption-diffusion and absorption-condensation unit, where four design units are structurally differentiated, as follows:

A) Supply unit (A) (FIG. 1), comprising:
 a) thermo worm conveyor 1 equipped with a tubular heat-resistant metal housing 2 comprising and driven by an electric motor and reduction gear, metal rod-axis 4, on which a non-uniform-step spiral is installed, and the middle part of the metal housing 2 of the thermo worm conveyor 1 is equipped with electric heaters 3 and temperature sensors;
 b) intermediate vessel 5 for pouring the melt from thermo worm conveyor 1, equipped with cover 6, in which degasser 7 and explosion-proof valve 8 are mounted, and in the middle of the intermediate vessel 5 there are valves 9 to feed other main and/or auxiliary reagents for the polymerization process;
 c) screw feeder 10, driven by an electric motor and reduction gear, with a built-in, one-step monolithic transport coil 11, receiving the melt from the intermediate vessel 5 and feeding it to an autoclave-type reactor with a mixer, which is also equipped with temperature sensors and a pressure sensor.

B) Reaction unit (B) (FIG. 1), comprising:
 a) reactor body 12 with mixer 18 and heating coil 23 built into the reactor body 12, which is equipped with temperature and pressure sensors, and in the upper part of which a fixed outlet pipe 24 is installed for the installation of diffuser 25;
 b) reactor cover 13 fixed on top of reactor body 12, in which there are inlet openings located laterally and opposite to each other, to which pipeline 14 to feed a reaction mixture from the screw feeder 10 and an inlet pipe with non-return valve 20 are fixed to introduce condensate from the outlet of the double hull heat exchanger 22, back into the inside of reactor body 12. In the upper part of the cover 13 there is a pipe 15 installed for fixing electric motor 16 and reduction gear 17, through which the mixer 18 is driven inside reactor body 12, and the mixer is installed at the bottom of reactor body 12 and connected to reduction gear 17 by a high-temperature-resistant metal rod 19.

C) Combined absorption-diffusion and absorption-condensation unit (C) (FIG. 1 and FIG. 2), including:
  a) diffuser 25 with integrated non-return valve 26;
  b) pipeline 27 fixed at one end to diffuser 25 and at the other end to rectification dish 28 built into the double hull heat exchanger 22;
  c) double hull heat exchanger 22, in the outer hollow cylindrical housing 29 of which a hollow conical tubular housing 30 is installed, connected to the upper part of rectification dish 28 built into housing 29.
  d) pipeline 21, one end of which is fixed to the outlet of double hull heat exchanger 22, and the other end is fixed to an inlet pipe with a non-return valve 20, the inlet pipe of which is fixed to a lateral inlet in cover 13.
E) Unit for discharge of the finished polymer (D), including:
  (a) outlet pipeline 31 fixed at one end to the bottom of reactor body 12 and at the other end to outlet worm conveyor 32;
  (b) outlet worm conveyor 32 driven by an electric motor and reduction gear, and ending with an outlet worm head 33 to seal the system and pass the finished product through.

DETAILED DESCRIPTION

Figure 1:
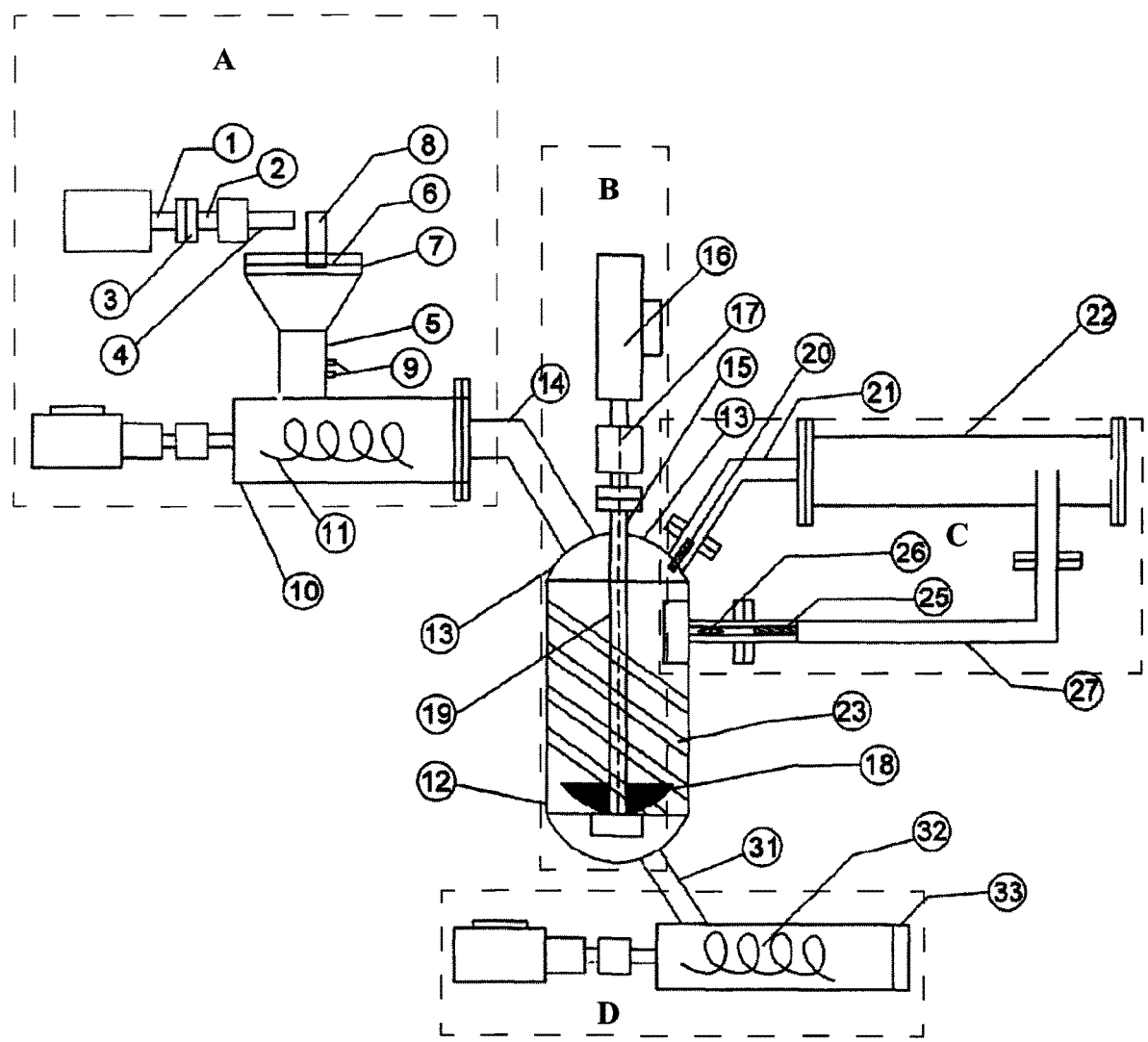
FIG. 1—General arrangement drawing of the polymerization installation.
Figure 2:
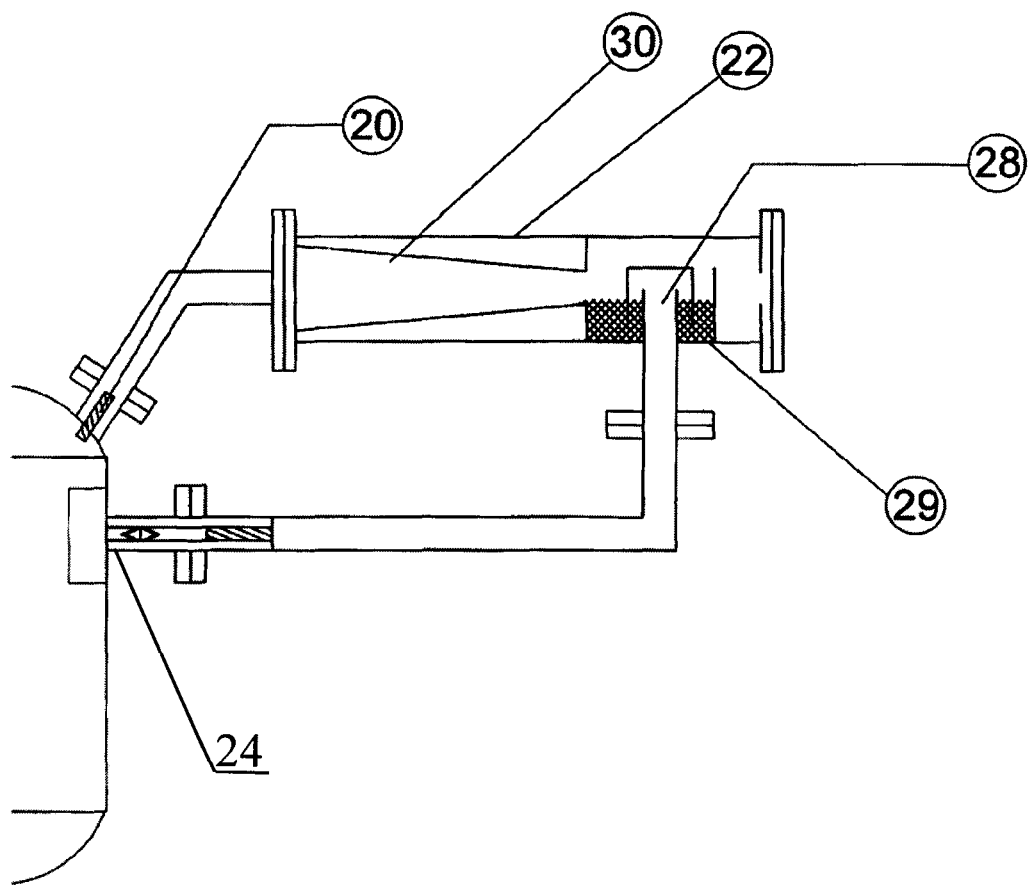
FIG. 2—Longitudinal section of the combined absorption-diffusion and absorption-condensation unit.

The supply of primary or secondary polymer used as the main starting reagent in the supply unit is carried out through a thermo worm conveyor 1 equipped with a tubular heat-resistant metal housing 2, in the middle of which there are annular electric heaters 3 installed. The number and power of electric heaters 3 is determined by the capacity of the thermo worm conveyor 1 and the temperature to which the starting polymer subject to melting is to be heated. The working area of the thermo worm conveyor 1 consists of rod-axis 4 driven by an electric motor and reduction gear, on which a three-step worm spiral is installed. The connection between the reduction gear and the worm conveyor axis 4 is fixed. Thermo worm conveyor 1 is horizontally arranged with a free outlet, from where the polymer melt enters intermediate vessel 5 located beneath, which is tubular, vertically arranged, heat-resistant and high-pressure resistant. Intermediate vessel 5 serves both as a tank after the outlet of the thermo worm conveyor 1 and a dosing system for the polymerization installation according to the present invention. In the upper part of intermediate vessel 5 there is a cover 6 installed to seal the vessel and the working part of the installation after the end of the melt supply from thermo worm conveyor 1. In cover 6 of intermediate vessel 5 there are degasser 7 and explosion relief valve 8 installed. In the middle of the intermediate vessel 5, valves 9 are installed to feed other main and/or auxiliary reagents for the polymerization process. The lower part of intermediate vessel 5 is fixed to screw feeder 10, which is located horizontally, with a tubular, heat-resistant and high-pressure-resistant metal housing in which a single-step monolithic transport coil 11 is installed. Screw feeder 10 is driven by electric motor with reduction gear, the power of which is determined by the capacity and speed of supply of the vertically arranged polymerization reactor of autoclave type, which is resistant to high temperature and pressure.

In the upper part of reactor body 12 there is a fixed cover 13. Pipeline 14 fixedly attaches screw feeder 10 to an inlet opening located laterally in cover 13, through which the reaction mixture enters reactor body 12. In the upper part of cover 13, along the central axis of the reactor body 12, there is pipe 15 fixed for mounting electric motor 16 and reduction gear 17 to drive mixer 18 in reactor body 12, which is located at the bottom of reactor body 12 and is connected to reduction gear 17 by a high temperature resistant metal rod 19. Laterally and opposite to pipeline 14, a pipe with a fixed non-return valve 20 is fixed in cover 13, which is fixed to pipeline 21 for taking the condensate from the absorption-condensation zone of double hull heat exchanger 22, back to the inner part of reactor body 12. Couplings for installing temperature and pressure sensors, as well as a coupling for the installation of an explosion-proof valve are also mounted on cover 13 of reactor body 12. Reactor body 12 is also equipped with temperature and pressure sensors, as well as with built-in heating coil 23.

In the upper part of reactor body 12, under the fixed cover 13, there is an outlet pipe 24 fixed, located at the start of the combined absorption-diffusion and absorption-condensation unit and designed to provide fixed fastening of diffuser 25, with built-in non-return valve 26 which is to provide a rectilinear movement in the direction of diffuser 25 to a multicomponent, mainly gaseous mixture formed above the reaction zone at the bottom of reactor body 12. High strength, temperature-resistant pipeline 27 fixes diffuser 25 to rectification dish 28 mounted to and extending to the inner part of outer housing 29 of the double hull heat exchanger 22. Pipeline 27 providing absorption-diffusion interaction and movement of multi-component, thermodynamic flow of a mainly gaseous mixture with a high temperature, is initially horizontally arranged at a length comparable to the dimensions of two hull heat exchanger 22, then it rises vertically to its fixed connection to rectification dish 28. Heat exchanger 22 is a horizontally arranged hollow double hull vessel. In the outer cylindrical housing 29 of the double hull heat exchanger 22 there is a hollow conical tubular body 30 functioning as a Venturi pipe, which is connected to the upper part of rectification dish 28, thud forming an absorption-condensation zone and an intensive heat exchanging zone in the double hull heat exchanger 22. One end of condensate drain line 21 is fixed to the outlet of double hull heat exchanger 22, and the other end of pipeline 21 is fixed to the inlet pipe with a non-return valve 20 fixed inside, allowing for pressure reduction and rectilinear movement of the condensate from the absorption-condensation zone of double hull heat exchanger 22, back to the internal part of reactor body 12, through a side opening in cover 13, to which it is fixedly attached. Outlet pipeline 31 is fixed to the bottom of reactor body 12, which at its other end is fixed to outlet worm conveyor 32, ending with an outlet worm head 33 to seal the working area of the installation and let the resulting outlet polymer pass through. Temperature sensors are mounted to the outlet worm head 33 to perform temperature control on the finished product.

The fixed connections in the polymerization installation and the absorption-diffusion and absorption-condensation unit integrated therein should be preferably made as flange connections.

The polymerization installation with the combined absorption-diffusion and absorption-condensation unit integrated therein, according to the invention, allows for the realization of different types of polymerization processes, i.e. addition, emulsion, suspension or radical polymerization.

As a result of the abovesaid, it is also possible to prepare various polymers and/or copolymers, such as:
- poly (ethylene-vinyl acetate) copolymers by addition polymerization;
- latex products, for example butadiene styrene by addition, emulsion or radical polymerization;
- methyl methacrylate and its copolymers by emulsion or suspension polymerization;
- styrene acrylonitrile copolymers by addition, emulsion or suspension polymerization;
- styrene carboxylate copolymers for concrete modifications by emulsion or suspension polymerization;
- low density polyethylene (LDPE) or high density polyethylene (HDPE) by free radical mechanism.

Both primary and secondary polymers or primary process waste may be used as starting reagents in the polymerization installation with integrated, combined absorption-diffusion and absorption-condensation unit under the present invention.

The advantages of the polymerization installation with integrated combined absorption-diffusion and absorption-condensation unit according to the invention are:
- its wide applicability for obtaining different types of polymers and/or copolymers;
- the possibility of carrying out different types of polymerization processes, including the production of the same or similar polymers and/or copolymers by different types of polymerization processes;
- its low energy consumption, due to the elimination of the need to remove the excess reaction heat obtained during the polymerization processes and its utilization directly to maintain the chemical and physico-chemical processes taking place inside the polymerization installation according to the invention.

EMBODIMENT OF THE INVENTION

The invention is illustrated by the following examples, which clarify it without limiting its scope of protection.

Preparation of Poly(Ethylene-Vinyl Acetate) Copolymer

Example 1

Primary polyethylene (LDPE) is fed to the thermo worm conveyor and heated to melt, and is mixed with vinyl acetate and sodium persulfate in the intermediate vessel, then the reaction mixture is fed to the reactor body. The temperature in the reaction zone gradually rises to 190° ° C. with continuous mixing of the reaction medium at 20 rpm until the pressure increases and a process of gas recirculation begins, where the fluid mixture formed passes through the diffuser and at high speed through the absorption-diffusion area of the high-strength and temperature-resistant pipeline, after which it enters the rectification dish and condenses in the double hull heat exchanger. The condensate from the absorption-condensation part of the heat exchanger returns to the reactor through the non-return valve. The recirculation cycle continues until the addition copolymerization process is completed after 2 hours, following which the product obtained is discharged from the reactor through the outlet pipeline, the outlet worm conveyor and the outlet worm head.

Example 2

Secondary polyethylene (HDPE) is fed and heated to melt in the thermo worm conveyor, followed by processes similar to those described in Example 1, except that the temperature in the reaction zone rises to 250° C. while mixing at 10 rpm until the end of the copolymerization process in 4.5 hours.

Preparation of Maleated Polypropylene

Example 3

Polypropylene homopolymer is fed and heated in the thermo worm conveyor, and in the intermediate vessel it is mixed with maleic anhydride with a density of 1.48 g/cm2. Processes similar to those described in Example 1 take place, except that the temperature in the feed worm conveyor rises to 210° C., and complete melting and homogenization of the polymer melt takes place in the reactor, while the reaction medium is mixed at 10 rpm at 230° C. The time for carrying out and completing the polymerization process is 3 hours, following which the modified melt is discharged through the outlet worm conveyor, cooled and granulated.

Example 4

Secondary polypropylene with a density of 0.86 g/cm$^3$ is fed and heated in the thermo worm conveyor, and mixed with maleic anhydride in the intermediate vessel. Processes similar to those described in Example 1 take place, except that the temperature in the worm feeder rises up to 220° C., and subsequently to 240° C. in the reaction zone, while mixing the reaction medium at 20 rpm. The time for carrying out and completing the polymerization process is 2 hours, after which the finished product is removed through the outlet worm conveyor, cooled and granulated.

Preparation of Low and High Density Polyethylene with Improved Resistance to UV Rays and Thermo-Oxidative Degradation Example 5

Primary polyethylene with a density of 0.92 g/cm$^3$ (LDPE) is fed and heated in the thermo worm conveyor, and in the intermediate vessel is mixed with Irganox 1010, CAS No. 6683-19-8, with a melting point of 110-125ºC, with chemical name tetraoxy pentaerythritol (3-(3,5-di-tert-butyl-4-hydroxyphenyl) propionate), having a molecular weight of 1178 g/mol, as a percentage by weight against the polymer equal to 0.4% by weight as an antioxidant and UVASORB HA77 DF, GAS No. 52829-07-9, a light stabilizer with chemical formula $C_{28}H_{52}N_2O_4$, with a molecular weight of 480.73 g/mol and a melting point of 82-85° C., in a ratio to the polymer weight of 0.5 to 1.5% by weight as a photo-stabilizing additive. Processes similar to those described in Example 1 take place, except that the temperature of the reaction mixture in the feed worm conveyor will increase up to 150ºC, and up to 190° C. in the reactor, while mixing the reaction medium at 10 rpm.

The homogenization time is 1 hour. The homogeneous and stabilized melt is removed from the reactor by the outlet worm conveyor.

Example 6

Primary polyethylene with a density of 0.97 g/cm$^3$ (HDPE) is fed and heated in the thermo worm conveyor, and in the intermediate vessel is mixed with Irganox 1010, CAS No. 6683-19-8, with a melting point of 110-125°C, with the chemical name tetraoxy pentaerythritol (3-(3,5-di-tert-butyl-4-hydroxyphenyl) propionate) and molecular weight of 1178 g/mol, as a percentage by weight against the polymer equal to 0.4% by weight as an antioxidant and UVASORB HA77 DF, GAS No. 52829-07-9, a light stabilizer with chemical formula $C_{28}H_{52}N_2O_4$, with a molecular weight of 480.73 g/mol and a melting point of 82-85° C., in a ratio to the polymer weight of 0.5 to 1.5% by weight as a photostabilizing additive. Processes similar to those described in Example 1 take place, except that the temperature in the feed worm conveyor will increase up to 150° C., and subsequently up to 190° C. in the reaction zone, while mixing the reaction medium at 15 rpm. The homogenization time is 1 hour. The homogeneous and stabilized melt is removed from the reactor by the outlet worm conveyor.

Preparation of Polystyrene, Styrene-Acrylate Latex

Example 7

In this case, the worm conveyor feeding to the reactor is eliminated and its supply is only carried out through the dosing valves of the intermediate vessel until the formation of a reaction mixture of styrene with a molar mass of 104.15 g/mol, density 909 kg/m$^3$ and boiling point 145° C., water as emulsifier, sodium persulphate with a molecular weight of 238.03 g/mol, density 2.4 g/cm$^3$ and water solubility 55.6 g/100 ml (20° C.) as initiator, and acrylic acid with a molar mass of 72.06 g/mol, density 1.05 g/cm$^3$ and boiling point 139° C.

The process is carried out with continuous mixing at 30 rpm, at temperatures up to 100° C. The processes are then carried out similarly to those described in Example 1 until the monomer is completely depleted and converted into polystyrene polymer, which after the removal from the reactor is separated from the aqueous phase by centrifugate and dried.

Example 8

The reactor is fed as in Example 7, through the dosing valves of the intermediate vessel until the formation of a reaction mixture of styrene, water as emulsifier, benzoyl peroxide with a density of 1.3 g/cm$^3$ and a melting point of 103° ° C. as initiator and methacrylic acid.

The process is carried out with continuous mixing at 40 rpm, until the monomer is completely depleted, at a temperature of up to 110° C., but the styrene acrylate particles remain in the liquid medium and the finished latex product is characterized by a dry content of 50-60% by weight.

The invention claimed is:
1. A polymerization installation, comprising:
   a supply unit (A),
   a reaction unit (B) comprising an autoclave polymerization reactor, wherein the autoclave polymerization reactor comprises:
      a reactor body,
      a mixer located at the bottom of the reactor body, and
      a reactor cover fixedly connected on top of the reactor body,
   an integrated, combined absorption-diffusion and absorption-condensation unit (C), and
   a unit for discharge of a finished product (D),
   wherein:
   a) the supply unit (A) configured to supply a primary or secondary polymer as a main starting reagent, comprising:
   a thermo worm conveyor equipped with a tubular metal housing with an axis located therein, driven by an electric motor and reduction gear and a middle part of the tubular metal housing of the thermo worm conveyor is equipped with electric heaters and temperature sensors to achieve melting of the primary or secondary polymer, free unconnected outlet of the thermo worm conveyor being located above an intermediate vessel having an upper conical part and a lower tubular part for pouring a polymer melt from the thermo worm conveyor, the intermediate vessel being equipped with a cover, in which a degasser and an explosion-proof valve are installed, while in the lower tubular part of the intermediate vessel there are valves installed for supplying other reagents, and a lower end of the lower tubular part of the intermediate vessel is fixed to a screw feeder with a one-step monolithic transport coil built therein for forming and transporting a reaction mixture of the polymer melt and the other reagents to the reaction unit (B);
   b) the reaction unit (B) further comprises:
   a heating coil built into the reactor body, and
   a first inlet openings and a second inlet opening are located laterally in the reactor cover and opposite to each other, the first inlet opening is fixedly attached to a pipeline for feeding the reaction mixture from the screw feeder, and on an upper part of the reactor cover, a pipe is installed for fixing an electric motor and reduction gear that actuate the mixer located at the bottom of the reactor body, and the mixer is connected to the reduction gear by a metal rod;
   c) the combined absorption-diffusion and absorption-condensation unit (C) configured to provide absorption-diffusion and absorption-condensation interactions, comprising:
   an inlet pipe with a fixed non-return valve rigidly connected to the second inlet opening in the reactor cover, configured for introducing condensate from an outlet of a double hull heat exchanger back inside to the reactor body,
   an outlet pipe fixed in an upper part of the reactor body, configured for fixed attachment of a built-in non-return valve and a diffuser to the combined absorption-diffusion and absorption-condensation unit (C), and
   a pipe configured to provide absorption-diffusion interaction which is fixedly connected at one end to an outer end of the outlet pipe in the upper part of the reactor body, and the other end of the pipe configured to provide absorption-diffusion interaction is fixed to a rectification dish, wherein the pipe is extending into an inner part of an outer housing of the double hull heat exchanger, the outer housing also comprising a hollow conical body opened with its smaller opening to an upper part of the rectification dish, thereby forming an absorption-condensation zone within the double hull heat exchanger, and a condensate drain line is fixedly attached between the outlet of the double hull heat exchanger, on a side of a bigger opening of the hollow conical body and the reaction unit (B) through the inlet pipe with the fixed non-return valve installed therein, which is fixed to the second inlet openings located laterally in the reactor cover of the reactor body; and
   d) the unit for discharge of the finished product (D) comprises an outlet pipeline fixed at one end to the bottom of the reactor body, and at the other end to an outlet worm conveyor ending with an outlet worm head.

2. The polymerization installation according to claim 1, wherein fixed connections therein comprise a flange connections.

3. The polymerization installation according to claim 1, wherein, the pipe configured to provide absorption-diffusion interaction is initially horizontally arranged, with a length commensurate with a length of the double hull heat exchanger and after that raised vertically until it is rigidly connected at its other end to the rectification dish, and the rectification dish is fixedly attached to and built into the outer housing of the double hull heat exchanger.

4. A method of preparing poly (ethylene-vinyl acetate) copolymers, comprising preparing the poly (ethylene-vinyl acetate) copolymers in the polymerization installation according to claim 1.

5. A method of preparing polystyrene and styrene-acrylate latex products, comprising: preparing the polystyrene and styrene-acrylate latex products in the polymerization installation according to claim 1.

6. A method of preparing a low density polyethylene (LDPE) or a high density polyethylene (HDPE), comprising: preparing the low density polyethylene (LDPE) or the high density polyethylene (HDPE) in the polymerization installation according to claim 1.

\* \* \* \* \*